Patented July 14, 1936

2,047,923

UNITED STATES PATENT OFFICE 2,047,923

BENZOTHIAZYL DISULPHIDES AND PREPARATION THEREOF

Jan Teppema, Wayne, N. J., assignor to Wingfoot Corporation, Wilmington, Del., a corporation of Delaware No Drawing. Application March 24, 1931,
Serial No. 525,043

20 Claims. (Cl. 260—16)

This invention is predicated upon the discovery that organic di-sulphides having a structure somewhat analogous to that of the thiazyl disulphides may be prepared by interacting an aromatic sulphur halide of the type represented by the formula R—S—X, where R is an aryl group and X is a halogen, with a metallic salt of a mercaptan, for example the sodium salt of mercaptobenzothiazole or the sodium salt of diethyl dithio carbamate. The manufacture of the reaction product of 2-benzoyl 4-nitro phenyl sulphur bromide and the sodium salt of mercaptobenzothiazole is disclosed, but not claimed, in Patent No. 1,805,057, granted May 12, 1931. The manufacture of the diethyl dithiocarbamate reaction product is similarly disclosed in Patent No. 1,809,457, granted June 9, 1931.

According to my invention, the mercaptobenzothiazole reaction product may conveniently be formed by dissolving the sodium salt of mercaptobenzothiazole (8.35 parts by weight) in boiling alcohol and allowing the solution to cool until it is lukewarm. At this point, 17 parts by weight of 2-benzoyl 4-nitro phenyl sulphur bromide are added. In a short time the solution thus obtained assumes a dark red color, which color, however, soon disappears, a yellow precipitate being formed. The solution containing the precipitate is boiled for a period of one hour and is then cooled and filtered. The precipitate may be washed with water and then air dried. The material thus obtained, which consists essentially of the desired reaction product, may be obtained in a higher state of purity by re-crystallization from benzol.

The same material may be obtained by the interaction of the ingredients in the presence of anhydrous aluminum chloride. In the practice of this method, 2-benzoyl 4-nitro phenyl sulphur bromide (85 parts by weight) are suspended in carbon bisulphide. To this suspension 45 parts of mercaptobenzothiazole and 45 parts of aluminum chloride are added. No reaction occurs at room temperature. However, if the mixture is refluxed for a period of two hours or more, hydrogen bromide begins to evolve. After the reaction has continued for a period of several hours (preferably 12 to 16), the reaction product is heated in a steam bath in order to drive off the volatile components of the mixture. The residue is poured upon ice water, filtered and the precipitate washed with water and dried. The product obtained is then re-crystallized from benzene and is obtained in the form of colorless needles having a melting point of between 122 to 123 degrees C. The yield obtained is practically quantitative. The reaction occurring between the primary materials may be represented by the following equation:

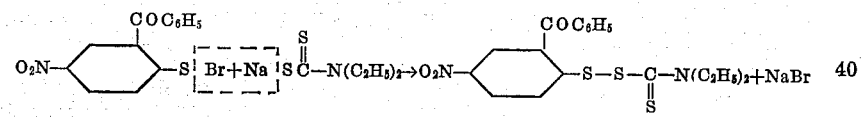

In a somewhat similar manner, a corresponding reaction product of 2-benzoyl 4-nitro phenyl sulphur bromide and the sodium salt of diethyl dithio carbamate may be prepared by reacting 8.5 parts by weight of sodium diethyl dithio carbamate and 16.9 parts by weight of 2-benzoyl 4-nitro phenyl sulphur bromide. This mixture should be heated under the reflux condenser for a period of approximately one hour, after which the volatile constituents are distilled off upon a steam bath. The residue should be poured into boiling water to remove any traces of benzol that may remain. The desired reaction product is obtained from the cold solution as a caked mass which readily dissolves in hot water. The reaction involved is represented by the equation:

$$O_2N-\langle\rangle-S\vert Br+Na\vert S\overset{S}{\underset{\Vert}{C}}-N(C_2H_5)_2 \rightarrow O_2N-\langle\rangle-S-S-\underset{\underset{S}{\Vert}}{C}-N(C_2H_5)_2+NaBr$$

(with COC$_6$H$_5$ substituent on the ring)

It is, of course, to be understood that in these reactions other metals may be employed in lieu of sodium, a specific example of such being potassium. Also, other halides such as chlorine may be substituted for bromine. It is also to be understood that the reactions are not limited to 2-benzoyl 4-nitro phenyl sulphur bromide, but instead any of the halide sulphur substituted aryl compounds of the general formula X—S—R, where R is aryl and X is halogen, may be substituted in lieu thereof.

For 2-benzoyl 4-nitro phenyl sulphur bromide, other nitro phenyl sulphur halides may be substituted. Such compounds include materials having the following formulae:

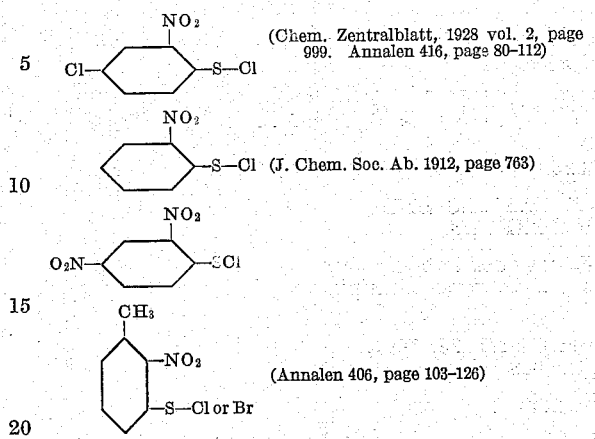

(Chem. Zentralblatt, 1928 vol. 2, page 999. Annalen 416, page 80-112)

(J. Chem. Soc. Ab. 1912, page 763)

(Annalen 406, page 103-126)

These compounds may be reacted with any of the salts of mercaptans described or with corresponding salts of other sulphur substituted aryl compounds such as thio phenol, ortho or para amino thio phenol or the sodium salt of piperydyl dithio carbamate to form disulphides.

It is thus apparent that an extremely simple method of preparing disulphides of various organic compounds is provided. These compounds, of course, are useful for various purposes. For example, the reaction product of the sodium salt of mercaptobenzothiazole and 2-benzoyl 4-nitro phenyl sulphur bromide and the corresponding reaction product of sodium diethyl dithio carbamate and 2-benzoyl 4-nitro phenyl sulphur bromide are excellent accelerators of vulcanization. Other uses of these various materials will occur to those skilled in the art.

Although I have described but the preferred embodiment of the invention, it will be apparent to those skilled in the art that the invention is not so limited but that various modifications may be made therein without departing from the spirit of the invention or from the scope of the appended claims. It is intended that the patent shall cover, by suitable expression in the appended claims, whatever features of patentable novelty reside in the invention.

What I claim is:

1. A method of preparing compounds having the formula

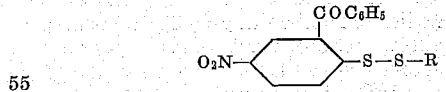

in which R represents a benzothiazole nucleus, which comprises reacting 2-benzoyl 4-nitrophenyl sulphur halide with an alkali metal salt of mercaptobenzothiazole.

2. A method of preparing disulphides having the general formula

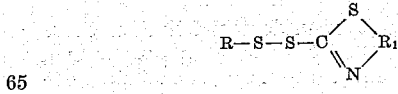

in which R and R₁ are benzenoid nuclei, which comprises reacting the sulphur halide of a nitro-substituted benzenoid compound with an alkali metal-salt of a mercaptobenzothiazole.

3. A method of manufacturing compounds having the general formula

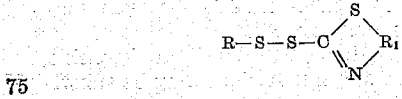

in which R is a nitro-substituted benzene group and R₁ is a benzenoid group, which comprises reacting a sulphur halide of the nitro-substituted benzene with a sodium salt of a mercaptobenzenoid thiazole.

4. Substances having the formula

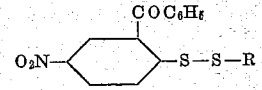

in which R represents a benzothiazole nucleus, prepared by reacting 2-benzoyl 4-nitro phenyl sulphur halide with an alkali metal salt of mercaptobenzothiazole.

5. Substances having the general formula

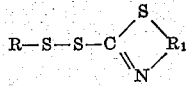

in which R and R₁ are benzenoid nuclei, prepared by reacting the sulphur halide of a nitro-substituted benzenoid compound with an alkali metal salt of a mercaptobenzothiazole.

6. Substances having the general formula

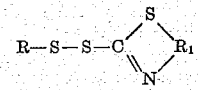

in which R is a nitro-substituted benzene group and R₁ is a benzoid group, prepared by reacting a sulphur halide of the nitro-substituted benzene with a sodium salt of a mercaptobenzenoid thiazole.

7. A nitro phenyl benzothiazyl disulphide.
8. A nitro aromatic benzothiazyl disulphide.
9. A nitro benzenoid benzo thiazyl disulphide.
10. A benzenoid dithio benzenoid thiazole.
11. 2-benzoyl 4-nitro phenyl benzothiazyl disulphide.
12. Substances having the formula

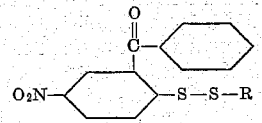

in which R represents a benzothiazyl nucleus.

13. Substances having the general formula

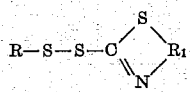

in which R and R₁ are benzenoid nuclei.

14. Substances having the general formula

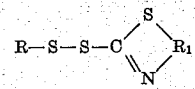

in which R is a nitro-substituted benzene group and R₁ is a benzenoid group.

15. A method of making a nitro phenyl benzothiazyl disulphide which comprises reacting in the presence of an organic solvent, an alkali metal salt of mercaptobenzothiazole and a nitro phenyl sulphur halide, separating out the nitro phenyl benzothiazyl disulphide and purifying it by recrystallization.

16. The method of preparing organic disulphides which comprises reacting an aromatic sulphur halide with a water soluble salt of an aromatic mercaptan.

17. The method of preparing organic disulphides which comprises reacting a benzenoid sulphur halide with an alkali metal salt of an aromatic mercaptan.

18. The method of preparing organic disulphides which comprises heating in a liquid medium an aromatic sulphur halide with a water soluble salt of an aromatic mercaptan and segregating the resulting disulphide.

19. The method of preparing 2-benzoyl 4-nitro phenyl benzothiazyl disulphide which comprises heating in a liquid medium 2-benzoyl 4-nitro phenyl sulphur bromide with an alkali metal salt of mercaptobenzothiazole and segregating the product.

20. The mono nitro phenyl benzothiazyl disulphides.

JAN TEPPEMA.